US012669457B2

(12) United States Patent
Do Couto et al.

(10) Patent No.: US 12,669,457 B2
(45) Date of Patent: Jun. 30, 2026

(54) MESOFLUIDIC IMPEDIMETRIC SENSOR FOR STAINLESS STEEL SCALE ANALYSIS

(71) Applicants: PETRÓLEO BRASILEIRO S.A.—PETROBRAS, Rio de Janeiro (BR); CENTRO NACIONAL DE PESQUISA EM ENERGIA E MATERIAIS—CNPEM, Campinas (BR)

(72) Inventors: Bruno Charles Do Couto, Rio de Janeiro (BR); Tiago Cavalcante Freitas, Rio de Janeiro (BR); Iris Medeiros Junior, Rio de Janeiro (BR); Angelo Luiz Gobbi, Campinas (BR); Monica Teixeira Da Silva, Rio de Janeiro (BR); Luis Carlos Silveira Vieira, Campinas (BR); Rosane Alves Fontes, Rio de Janeiro (BR); Jussara De Mello Silva, Rio de Janeiro (BR); Renato Sousa Lima, Rio de Janeiro (BR); Rogerio Mesquita De Carvalho, Campinas (BR); Stefan Suarez Ferreira, Rio de Janeiro (BR); Vitória Maria De Souza Freitas, Campinas (BR); Ricardo Augusto Pereira de Avila, Rio De Janeiro (BR); Waldemir Jose Paschoalino Junior, Campinas (BR)

(73) Assignees: PETRÓLEO BRASILEIRO S.A.—PETROBRAS, Rio de Janeiro (BR); CENTRO NACIONAL DE PESQUISA EM ENERGIA E MATERIAIS—CNPEM., Campinas (BR)

( * ) Notice: Subject to any disclaimer, the term of this patent is extended or adjusted under 35 U.S.C. 154(b) by 164 days.

(21) Appl. No.: 18/644,272

(22) Filed: Apr. 24, 2024

(65) Prior Publication Data

US 2024/0418665 A1     Dec. 19, 2024

(30) Foreign Application Priority Data

Jun. 14, 2023     (BR) .......................... 1020230116809

(51) Int. Cl.
G01N 27/02          (2006.01)
G01N 27/416          (2006.01)

(52) U.S. Cl.
CPC ......... *G01N 27/02* (2013.01); *G01N 27/4161* (2013.01)

(58) Field of Classification Search
CPC ...... G01N 15/12; G01N 27/02; G01N 27/028; G01N 27/4161; G01N 27/44791;
(Continued)

(56) References Cited

U.S. PATENT DOCUMENTS

2022/0205942 A1*  6/2022  Dasgupta ............... G01N 27/38
2022/0265175 A1*  8/2022  Helwa ................ A61B 5/14507

FOREIGN PATENT DOCUMENTS

CN        110514720 A  * 11/2019  ............... G01N 3/56
DE        19957406        5/2001
WO    WO-2023213897 A2 * 11/2023  .............. H01M 8/16

OTHER PUBLICATIONS

M. Izadi, A. Yazdiyan et al., Influence of Temperature Variation on the Formation and Corrosion Protective Performance of Calcium Carbonate Deposits in Artificial Seawater, JMEPEG (2019) 28:4221-4233.
(Continued)

*Primary Examiner* — Son T Le
(74) *Attorney, Agent, or Firm* — Womble Bond Dickinson (US) LLP

(57) ABSTRACT

The main object of this disclosure is to enable real-time impedimetric detection which provides greater sensitivity to
(Continued)

scale formation in stainless steel tubes, as minimal changes on the capillary surface are detected in the form of an increase in the overall impedance of the system for systems in flow with real-time detection. Thus, the apparatus of the present disclosure includes at least one potentiostat, at least one working electrode (WE), at least one reference electrode (RE) and at least one counter electrode (CE), and at least one tube with an opening adapted to pass a fluid flow and at least two polymeric connectors at the ends, in which the working electrode is connected to the inlet of said tube.

10 Claims, 4 Drawing Sheets

(58) Field of Classification Search
CPC .. G01N 29/02; G01N 29/022; G01N 30/7233; G01N 27/327; G01N 27/30; G01N 27/302; G01N 27/3271
See application file for complete search history.

(56) References Cited

OTHER PUBLICATIONS

Héla Karoui et al. , Electrochemical scaling of stainless steel in artificial seawater: Role of experimental conditions on CaCO3 and Mg(OH)2 formation, Elsevier, Desalination 311 (2013) 234-240.
Ch. Barchiche et al., Characterization of calcareous deposits in artificial seawater by impedance techniques, 3—Deposit of CaCO3 in the presence of Mg(II), Pergamon, Electrochimica Acta 48 (2003) 1645-1654.

* cited by examiner

MESOFLUIDIC IMPEDIMETRIC SENSOR FOR STAINLESS STEEL SCALE ANALYSIS

FIELD OF APPLICATION

The present disclosure falls within the field of electrolytic removal process of materials, specifically using equipment for microfluidic scale simulation, more specifically in the development of devices for simulating scale formation.

BACKGROUND OF THE DISCLOSURE

Fouling in pipelines occurs due to the accumulation of solid deposits on the internal walls. These deposits can be made up of a variety of substances, including mineral scale, organic matter, and corrosion products. Scale formation is a complex process that can be influenced by a number of factors, including the composition of the crude oil being transported, the temperature and pressure of the pipeline, and the presence of certain bacteria. There are several solutions for inhibiting fouling.

One of the main factors contributing to scale formation is the presence of dissolved solids in crude oil. These solids can precipitate from the oil and settle on the walls of the pipeline when the temperature and pressure of the oil change, as it flows through the pipeline. For example, as the oil cools, solids that were previously in solution can begin to form crystals and adhere to the surface of the pipeline. Similarly, as the oil pressure decreases, solids can come out of solution and form deposits in the pipeline.

Inorganic or mineral scale is one of the most common classes of scale in the oil industry and is caused by the accumulation of inorganic salts, with low solubility, on the surface of pipelines. These scale can occur as a result of changes in ionic composition, pH, pressure, component partial pressure, and temperature of the flowing fluid.

In addition to the factors mentioned above, a crucial event for the formation of mineral scales is the incompatibility between the injection and formation water. The most commonly used injection water is seawater, which contains mostly sulfate ($SO_4^{2-}$) and carbonate ($CO_3^{2-}$) ions, while formation water is rich in $Ca^{2+}$, $Mg^{2+}$, $Sr^{2+}$ and $Ba^{2+}$ ions. Their combination results in scales of calcium sulfate ($CaSO_4$), barium ($BaSO_4$) and strontium ($SrSO_4$) and calcium carbonate ($CaCO_3$), among others. Sulfates are considered one of the most difficult scales to remove, as they are poorly soluble in acids or other common solvents, in addition to having high hardness. $BaSO_4$, known as barite, is one of the easiest sulfates to precipitate due to its precipitation kinetics, and its solubility increases with the temperature, pressure, and ionic strength of the brine. $CaSO_4$ has particular characteristics of other sulfate scales, as it can precipitate in two distinct ways: anhydrite ($CaSO_4$) and gypsum ($CaSO_4 \cdot 2H_2O$), the latter being the most common form and occurring at lower temperatures.

$SrSO_4$ has high hardness, low solubility in water and at high temperatures. $CaCO_3$ depositions are the most common and cause the most problems in the oil industry; they usually come in the form of calcite, aragonite and vaterite, with calcite being their most stable form. A peculiarity of calcium carbonate scales is the influence of the partial pressure of $CO_2$ dissolved in the medium, and the higher the partial pressure, the greater the solubility.

The deposition of inorganic salts occurs due to variations in their solubility and, for this reason, it is essential to know the properties of each scale class in order to apply control and removal methods to mitigate the problems caused in oil wells.

STATE OF THE ART

Some state of the art documents disclose technologies that aim to analyze the behavior of the formation of limestone deposits on metal surfaces and use electrochemical components for this purpose.

Document DE19957406 discloses that, in a process of descaling pipes and water tanks, a copper or stainless steel cathode electrode is introduced and coupled to a direct current of 6-12 volts. The inner metal face of the tank acts as the anode. The subsequent electrolysis of the water separates the calcite, while the H+ ions released at the anode lower the pH, slightly dissolving the innermost layer of limestone that is released from the inner face of the boiler. After its release from the boiler surface, the scale falls off and can be completely removed by filtration or sedimentation.

In document DE19957406, an electrode (4) is introduced into the center of a metal boiler (1) whose inner face is encrusted with limestone soaked in water (2) and containing calcareous water (3). The electrode is connected to the negative side of a 6-12 volt DC power supply voltage to become a cathode, while the positive side is connected to the metal wall of the boiler to become an anode. Voltage (6) and current (5) are monitored by suitable instruments. Electrolysis splits water into hydrogen and oxygen. A concentration of OH-ions is released into the cathode, combining with the $Ca^{2+}$ ions present in the solution, reducing the level of calcite present in the water.

The $H^+$ ions released in the anode and inner wall of the boiler react with the $HCO_3^-$ ions present in the water, generating carbonic acid and dissolved free $CO_2$, drastically lowering the pH value and releasing limestone from the boiler wall.

It should be noted that, despite the similarities of the technical resources used, while the method of the present disclosure uses potential for salts deposition, DE19957406 uses voltage for removing scale, and the method of saline deposition is well described in the state of the art. In addition, said document does not disclose a flow system with impedimetric detection for scale analysis.

KAROUI H. (2013) discloses a study that comprises an investigation of the formation of electrochemical scale in stainless steel in artificial seawater. The scales formed were characterized by X-ray diffraction, Raman spectroscopy and scanning electron microscopy. It was found that the scales formed are mainly aragonite ($CaCO_3$).

The experiments in this article were carried out in a standard seawater solution (SSW) containing the main species present in natural seawater, as described by ASTM D1141 (American Society for Testing Materials). The pH of the seawater, fixed by the carbonate buffer reaction, was adjusted in all cases by 8.2 with 0.1 M NaOH solution. A thermostated glass electrochemical cell was used. Its large volume (500 mL) allowed to avoid a significant variation in the concentration of the species during the formation of deposits. The working electrode was a 304 L austenitic stainless steel (SS) rotating disc electrode with an area of 0.785 cm$^2$. KAROUI H. (2013) further discloses that the chronoamperometry method was applied to evaluate the precipitation rate.

Again, we reiterate that KAROUI H. (2013) in the aforementioned article does not describe a flow system with impedimetric detection for scale analysis. Thus, it is not possible to establish a comparison in the analysis of scale obtained by traditional methods used by the oil industry, such as "Tube blocking test" (TBT), since this article only uses a saline deposition method well described in the state of the art.

BARCHICHE et. al. (2003) discloses a technique in which limestone deposits were formed in steel under cathodic protection conditions in artificial seawater at various potentials from 0.9 to 1.4 V/SCE. The deposition kinetics was analyzed by chronoamperometry measurements and the limestone layers were characterized by electrochemical and electrohydrodynamic impedance spectroscopies, scanning electron microscopy observations and X-ray diffraction analyses.

BARCHICHE et. al. (2003) provides a double-walled glass electrochemical cell for temperature control. Its large volume (500 ml) allowed to avoid variations in the concentrations of the species during the formation of deposits. For all studies, the temperature of the cell, a parameter well known to greatly influence the processes, was set at 20° C. Chronoamperometry was used to monitor deposition and was coupled to electrochemical impedance (a.c.) investigations and electrohydrodynamic impedance (EHD) in order to complement the information on the morphology of the deposits.

Despite the apparent similarity of the three-electrode system and the use of chronoamperometry and electrochemical impedance spectroscopy (EIS) techniques, a rotating disc electrode (RDE) was used in this article, which does not allow the analysis of different outflow regimes to mimic the conditions present in the field. Changes in flows in circular pipelines are essential for the study of phenomena that lead to the formation of vortices and different mixing conditions that affect the deposition of salts on the inner walls of pipelines in real scenarios.

IZADI et. al. (2019) investigates the influence of temperature variation on the formation and behavior of calcium carbonate scales deposited on steel electrodes in artificial seawater. Chronoamperometry measurement, electrochemical impedance spectroscopy (EIS), scanning electron microscope (SEM) and X-ray diffraction (XRD) were used for analysis. An increase in temperature from 20 to 50° C. accelerated the oxygen reduction reaction, which increased the nucleation/deposition rate.

Chronoamperometry, SEM and XRD results indicated that complete electrode surface coverage was achieved at higher temperatures since a denser layer of scale deposits covered the entire metal surface and acted as a barrier against the passage of oxygen. The EIS results showed that better corrosion protection was obtained after deposition, which included a gradual decrease in temperature, indicating fewer paths through the deposited layer on the electrode surface.

IZADI et. al. (2019) presents a stationary system for the study of limestone growth and does not allow a direct comparison with the results of tube blocking test (TBT). In other words, the comparison with a stationary system has no theoretical basis, since the phenomena associated with outflow are extremely important for the study of scale formation.

In short, the main differentiating factor of the present disclosure is based on the fact that the apparatus (sensor) as developed allows the modification of the system to act in flow, mimicking the real condition for the formation of scales. Firstly, a micro/mesofluidic system, due to its flow regime and its volume/area ratio, allows a fast, sensitive and low-cost analysis, as small sample volumes are required. In addition, a flow system is close to the method commonly used for scale analysis by the oil industry, TBT, since it is possible to modulate the flow rates and simulate the flow regimes present in real systems.

The sensor of the present disclosure allows real-time impedimetric detection, with greater sensitivity, as minimal changes on the capillary surface are detected in the form of an increase in the overall impedance of the system and, although it has been used previously in stationary and rotating systems, it has never been applied to flow systems with real-time detection. In addition, the apparatus of the present disclosure allows the modification of the flow system, such as, for example, the coupling of more fluids at the inlet, enabling the mixing between different brines or oils in pre-established proportions, getting closer to the real environment.

In other words, one person skilled in the art, in possession of any of the above-mentioned documents, separately or together, would not have the support to provide in an obvious manner an electrochemical system in flux with a specific outflow regime and its volume/area ratio, which allow a fast, sensitive and low-cost analysis, since the necessary volumes of samples are very small, that mimic the actual operation of small-scale, real-time fouling.

SUMMARY OF THE DISCLOSURE

The main object of this disclosure is to enable real-time impedimetric detection which provides greater sensitivity to scale formation in stainless steel tubes, as minimal changes on the capillary surface are detected in the form of an increase in the overall impedance of the system for systems in flow with real-time detection. Thus, the apparatus of the present disclosure includes at least one potentiostat, at least one working electrode (WE), at least one reference electrode (RE) and at least one counter electrode (CE), and at least one tube with an opening adapted to pass a fluid flow and at least two polymeric connectors at the ends; in which the working electrode is coupled to the inlet of said tube. Scale induction, for example, may be done by chronoamperometry.

BRIEF DESCRIPTION OF THE DRAWINGS

To assist in identifying the main characteristics of the present disclosure, the referenced figures are presented as follows.

DETAILED DESCRIPTION OF THE DISCLOSURE

The present disclosure refers to a mesofluidic impedimetric sensor for the analysis of stainless steel scales that comprises:

at least one potentiostat;

at least one working electrode (WE), at least one reference electrode (RE) and at least one counter electrode (CE);

at least one tube with a diameter between 0.01 and 2.0 mm
and an opening adapted to pass a fluid flow and at least
two polymeric connectors at the ends;

wherein the working electrode is preferably coupled to the
entrance of said tube.

The working electrode (WE) is preferably a stainless steel
capillary, with a diameter of about 0.5 mm. The reference
electrode (RE) is preferably an Ag/AgCl electrode, and the
counter electrode (CE) is a platinum wire.

The fluid flow entering through said opening is preferably
provided with the aid of a peristaltic pump. The pumped
fluid is preferably a solution with a standard seawater
composition, as described by ASTM D1141.

Said two polymeric connectors at the ends are preferably
made of polypropylene.

Figure 1:
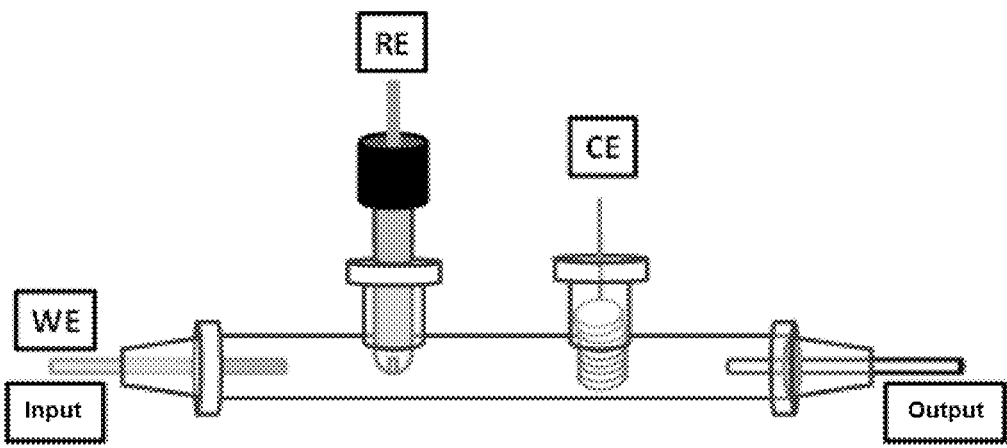
FIG. 1 shows a side view of the prototype with internal and external details of the main components.
Figure 2:
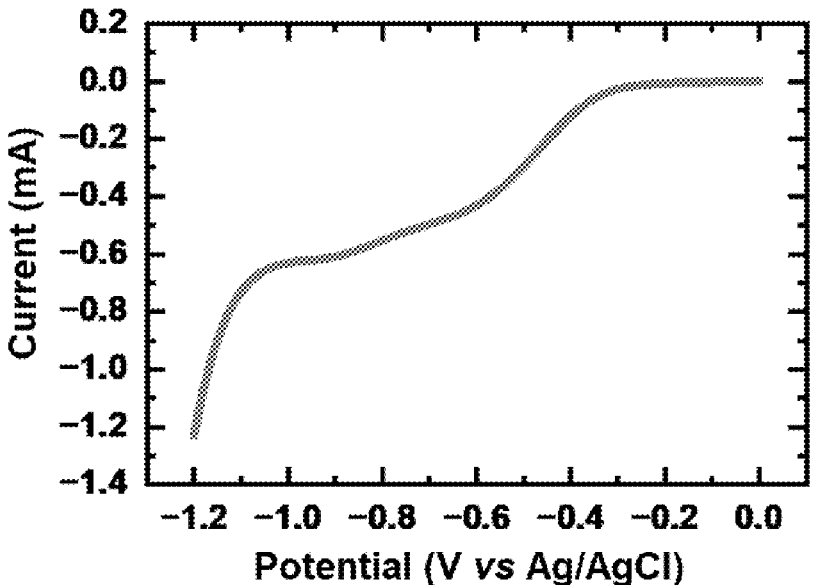
FIG. 2 shows a linear sweep graph.
Figure 3:
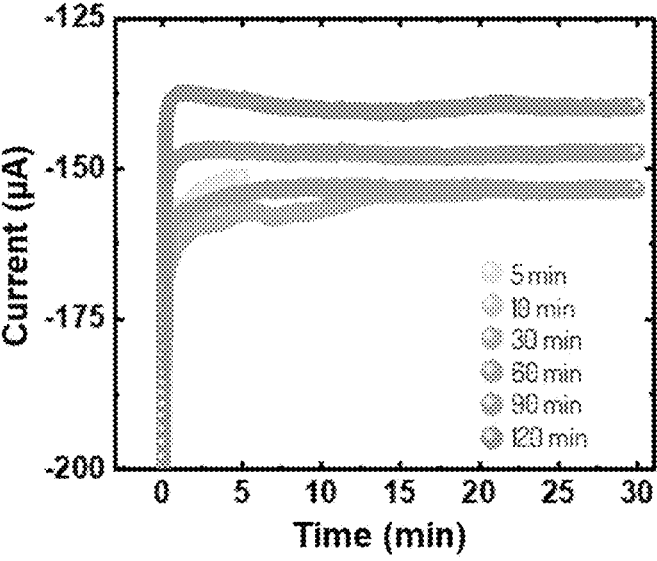
FIG. 3 shows a chronoamperometry graph.

To induce fouling, under different outflow regimes, the
chronoamperometry method was performed, in which a
constant potential was applied with a value of −1.1 V,
defined from the profile obtained from the linear scan, as
shown in FIGS. 2 and 3. This value was chosen due to the
need for negative potential for the formation of OH on the
capillary surface to induce the precipitation of $CaCO_3$.

This process takes into account hydrogen evolution
(REH) and oxygen reduction (RRO) reactions that occur at
potentials close to −1.1 V vs. Ag/AgCl. These reactions are,
generally, slow and depend on the pH of the medium and the
catalyst involved, as well as adsorption processes. These
reactions lead to the formation of OH, raising the pH in the
regions close to the working electrode (stainless steel),
which decreases the solubility of the $CaCO_3$, leading to scale
formation.

Figure 4:
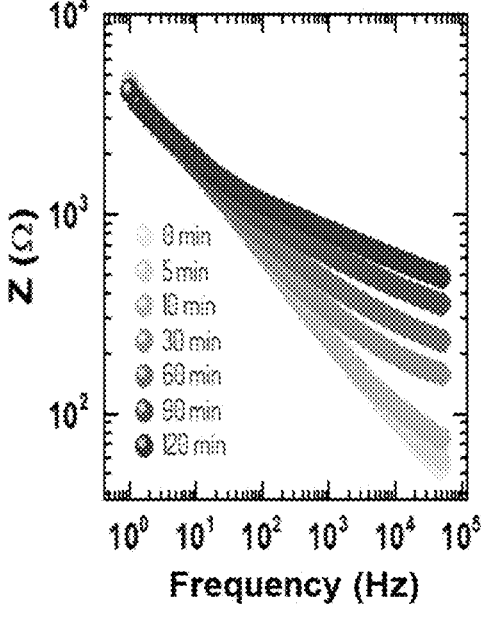
FIG. 4 shows a complex impedance graph.

After the chronoamperometric method was performed,
electrical impedance spectroscopy (EIS) measurements
were performed for the in-situ, real-time and continuous
analysis of the scale formation kinetics on the stainless steel
capillary surface, the WE, after predetermined electrodepo-
sition times, as reported in FIG. 4.

Figure 5:
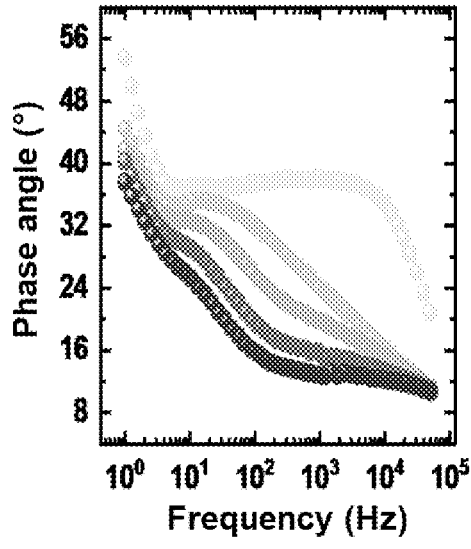
FIG. 5 shows a phase angle graph.
Figure 6:
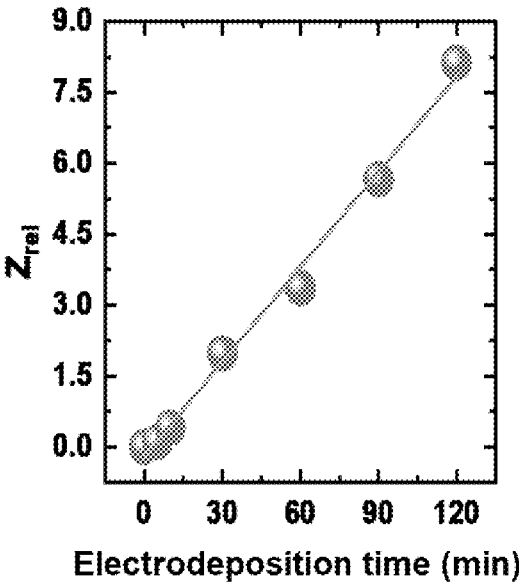
FIG. 6 shows a relative impedance graph.

This method allows to verify with high sensitivity the
growth of the encrusted salt from complex impedance (Z)
and phase angle data (FIG. 5) as a function of the ac
frequency of the WE excitation sinusoid signal. For this, a
direct current potential ($E_{dc}$) of −0.2 V and an alternating
current potential ($E_{ac}$) of 100.0 mV were applied under the
frequency range of 1.0 100 to 5.0 104 Hz. In addition, in
order to better analyze the data obtained, graphs of relative
impedance ($Z_{rel}$) were plotted, as shown in FIG. 6, wherein
the impedance of the blank (Z0), before starting the depo-
sition, is subtracted from the Z value at different times (Zi).

In order to increase the applicability of the method studied
in the evaluation in scenarios close to reality, the change in
brine temperature was evaluated. For this, it was necessary
to insert a heat exchanger (CT) between the pump outlet and
the brine inlet in the electrochemical system. The setpoint
and temperature control was performed with a digital tem-
perature controller coupled to a resistor inserted inside the
CT.

Figure 8:
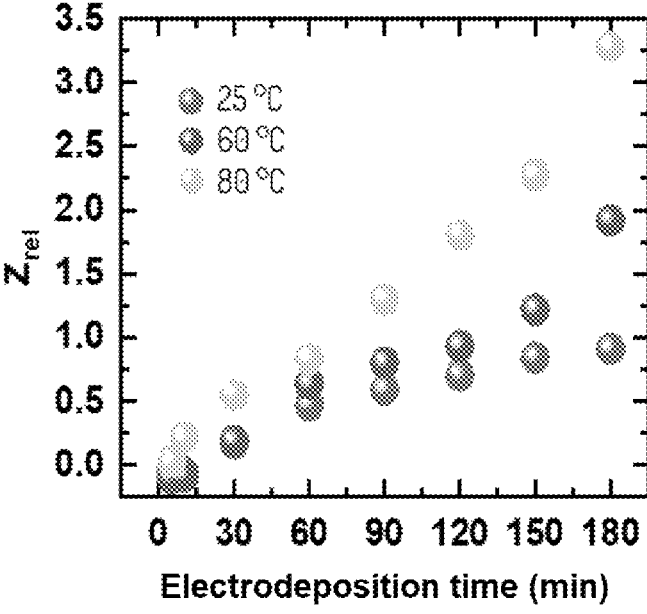
FIG. 8 shows a graph of impedance versus temperature.

The analyses were performed for capillaries with an
internal diameter (di) of 0.5 mm at a flow rate (Q) equivalent
to 1 ml min-1. Scanning electron microscopy (SEM) images
show a greater surface coating when compared to the same
flow rate in the capillary with greater di (1.1 mm). On the
other hand, the electrochemical results showed the same
behavior, with a decrease in the available area and an
increase in complex impedance (Z) as fouling occurs for
both, this factor may be related to the increase in pressure in
the system due to the smaller inlet hole, as shown in FIG. 8.

Figure 7:
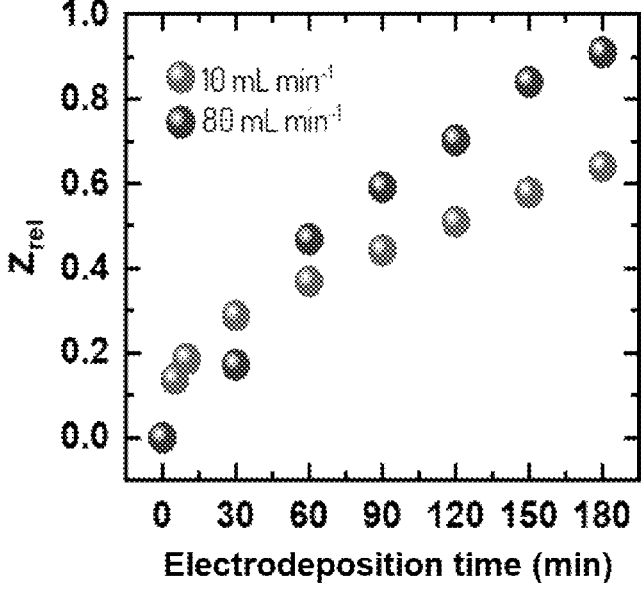
FIG. 7 shows a graph of impedance versus flow rate.

The relative impedance ($Z_{rel}$) increases over the experi-
mental time in a linear manner without reaching a stabili-
zation time, which may indicate that the metal surface is not
fully coated after 3 h of $CaCO_3$ deposition. Then, experi-
ments were carried out using flow rates of 10 (laminar
regime), and 80 ml $min^{-1}$ (turbulent regime), as shown in
FIG. 7. These results showed that, after 90 min, the resis-
tance values no longer vary over time for the turbulent
regime, which may be related only to the growth of the salt
layer, with the entire steel surface being covered by it.

On the other hand, for the laminar regime $Z_{rel}$ is constant
from 120 min, showing that salt deposition is slower for this
regime. Analyzing the variation in $Z_{rel}$, it was possible to
observe that Z increases more significantly between 30 and
60 min of deposition for the turbulent regime, considering
that the maximum value of $Z_{rel}$ was reached with 90 min of
deposition and represents 100% of the covered area. On the
other hand, for Q=10 mL·$min^{-1}$ in this same time interval,
the variation of $Z_{rel}$ was smaller, therefore, it was observed
that the variation rate of $Z_{rel}$ was higher for the turbulent
regime, showing that it entails more captive and sensitive
variations to fouling.

On the other hand, for the dependence of the values $Z_{rel}$
as a function of temperature, it is possible to observe that
with the increase in temperature the variation of $Z_{rel}$ is
greater, which may be related to a more severe fouling
process in the capillary walls. In addition, after 90 min of
$CaCO_3$ electroplating, the curve profile changes, from a
more stable process, to a more pronounced growth in $Z_{rel}$.
When the fouling time increases, the temperature seems to
affect the deposition more in situations where the tempera-
ture is higher. This may be related to the growth of the salt
layer not only depending on the nucleation that occurs on the
metal surface, but rather on an increase in the occurrence of
nucleation in the bulk of the solution, due to the decrease in
solubility with increasing brine temperature. This decrease
in solubility leads to the deposition of $CaCO_3$, which
increases the variation in $Z_{rel}$.

Thus, it is reiterated that the present disclosure allows a
simple and fast evaluation of the efficiency of antifouling
agents in different scenarios, since their use in mesofluidic
systems can evolve into easy-to-use systems, when com-
pared to the existing tests currently in the laboratory, for the
evaluation of fouling phenomena and tests of antifouling
products. And with potential for future applications in pro-
duction units. The equipment currently used for the evalu-
ation of the fouling phenomenon/dosage tests of antifouling
products is more expensive and larger. The proposed dis-
closure may even provide more detailed information about
the fouling phenomenon and the action of fouling inhibitors,
mainly from the possibility of evaluating the image of the
formed crystals.

The application of microfluidics in systems that mimic
established methods for scale studies and use of inputs, such
as Dynamic tube blocking test (TBT), is intended to simulate
and study the fundamental parameters for scale formation
and the use of remediable additives. The device is also used
to evaluate the use of different antifouling agents, optimize
the use of these chemical inputs on a microfluidic scale, and
systematically explore the effect of temperature and flow
rate, as well as understand the kinetics of scale formation. In
addition, it can monitor the early stages of the fouling
process since smaller capillaries can be used, leading to a
faster and more detailed analysis of the antifouling agents.

The developed system has the advantage of a simple and
quick evaluation of the efficiency of antifouling agents in
different scenarios encountered in the daily life of the oil industry. This evaluation occurs from the monitoring in situ and in real time of the degree of fouling by the variation of the system impedance, as well as the study of the mechanisms involved in these processes through chemical characterization. Thus, it is possible to obtain information about the scale kinetics and action of antifouling agents, with ease, from electrochemical device measurements, in addition to a low-cost electrochemical device and miniaturization compatibility.

In addition, the sensor allows to know the dependence of the shapes of the $CaCO_3$ crystals formed (aragonite, vaterite and calcite) from the conditions applied to the mesofluidic system (such as flow rate and temperature) with the aid of SEM images and EDS (energy dispersive spectroscopy) mapping. The fact that the device provides performance results of chemical products in a fast, detailed, sensitive and low sample consumption manner is a great advantage over the solutions currently applied, using expensive, non-portable equipment that often does not provide such detailed information about the performance of fouling inhibitors.

Those skilled in the art will value the knowledge presented here and will be able to reproduce the model in the embodiments presented and in other variants, covered in the scope of the attached set of claims.

The invention claimed is:

1. A mesofluidic impedimetric sensor comprising:
one or more potentiostat;
one or more working electrode (WE), one or more reference electrode (RE), and one or more counter electrode (CE);
one or more tubes having a diameter between 0.01 and 2.0 mm, an opening adapted to pass
a fluid flow, and two or more polymeric connectors at ends thereof;
wherein the one or more working electrode is connected to an entrance of the one or more tubes.

2. The mesofluidic impedimetric sensor according to claim 1, wherein the one or more working electrode (WE) comprises a stainless steel capillary.

3. The mesofluidic impedimetric sensor according to claim 1, wherein the one or more reference electrode (RE) comprises Ag/AgCl electrode.

4. The mesofluidic impedimetric sensor according to claim 1, wherein the one or more counter electrode (CE) comprises a platinum wire.

5. The mesofluidic impedimetric sensor according to claim 1, wherein the two or more polymeric connectors each comprises a polypropylene material.

6. The mesofluidic impedimetric sensor according to claim 1, wherein a scale is formed on the one or more working electrode (WE) through chronoamperometry.

7. The mesofluidic impedimetric sensor according to claim 1, wherein the mesofluidic impedimetric sensor provides real-time impedimetric detection in a mesofluidic system when fluid flows through the opening and the one or more tubes.

8. The mesofluidic impedimetric sensor according to claim 7, wherein the mesofluidic system includes one or more pipelines, and wherein the fluid flow includes crude oil.

9. A method using the mesofluidic impedimetric sensor according to claim 1, the method comprising determining in real-time relative impedance changes in a mesofluidic system having the mesofluidic impedimetric sensor connected thereto as indicative of scaling along inner surfaces of the one or more tubes when fluid flows therethrough.

10. The method according to claim 9, further comprising determining efficiency of one or more antifouling agents when present in the fluid flow through the one or more tubes.

* * * * *